US007947364B2

(12) United States Patent
Ghosh

(10) Patent No.: US 7,947,364 B2
(45) Date of Patent: May 24, 2011

(54) ENERGY-ATTENUATION STRUCTURE

(75) Inventor: Ashok Kumar Ghosh, Socorro, NM (US)

(73) Assignee: New Mexico Technical Research Foundation, Socorro, NM (US)

( * ) Notice: Subject to any disclaimer, the term of this patent is extended or adjusted under 35 U.S.C. 154(b) by 950 days.

(21) Appl. No.: 11/839,999

(22) Filed: Aug. 16, 2007

(65) Prior Publication Data

US 2009/0044475 A1 Feb. 19, 2009

(51) Int. Cl.
*B32B 3/26* (2006.01)
*B32B 5/14* (2006.01)
*B32B 3/00* (2006.01)

(52) U.S. Cl. ............... 428/304.4; 428/305.5; 428/308.4; 428/315.9; 428/320.2

(58) Field of Classification Search ............... 428/304.4, 428/305.5, 308.4, 315.9, 320.2
See application file for complete search history.

(56) References Cited

U.S. PATENT DOCUMENTS 5,545,458 A 8/1996 Fukushima et al.
5,670,758 A 9/1997 Borchers et al.
5,856,366 A * 1/1999 Shiveley et al. ................ 521/63
5,912,442 A 6/1999 Nye et al.
6,224,020 B1 5/2001 Hopkins et al.
2001/0031052 A1 10/2001 Lock et al.

* cited by examiner

*Primary Examiner* — Victor S Chang
(74) *Attorney, Agent, or Firm* — Robert W. Becker; Robert W. Becker & Assoc.

(57) ABSTRACT

An energy-attenuation structure comprising a core layer of cellular material. Substantially most of the cells of the cellular material are open cells, with those cells disposed in the central portion of the core layer being more open than are those cells disposed in outer portions of the core layer. The openness of the cells generally decreases from the interior of the core layer in a direction toward the outer portions. At least some of the cells of the core layer are filled with a liquid.

20 Claims, 6 Drawing Sheets

ENERGY-ATTENUATION STRUCTURE

BACKGROUND OF THE INVENTION

The present invention relates to an energy-attenuation structure, as well as to a method of producing such a structure.

SUMMARY OF THE INVENTION

The energy-attenuation structure of the present application comprises a core layer comprised of a material composed of cells, substantially most of which are open cells, wherein those cells disposed in a central portion of the core layer are more open than are those cells disposed in outer portions of the core layer, further wherein the openness of the cells generally decreases from an interior of the core layer in a direction toward the outer portions, and wherein at least some of the cells of the core layer are filled with liquid. The core layer is in particular comprised of resilient and flexible cellular material, such as an open-celled foam material. Furthermore, the material can be a composite structure having at least one skin layer disposed on at least one side of the core layer.

The energy-attenuation structure of the present application provides a spatially graded structure, i.e. the cell size of the material, the openness of the cells, the cell wall thickness, and/or the functionality of the cells is not homogeneous nor uniform from the interior of the core layer to the outer portions thereof. Thus, the cellular material, preferably a foam material can be adapted to a large number of applications, especially in view of the fact that the open cells in the central portion are adapted to attenuate high frequency, whereas those cells that act as "closed" cells are adapted to attenuate low frequency acoustics. Furthermore, under thermal loading, the closed cells that are closer to the outer surfaces and that are also filled with liquid will absorb heat energy, whereby the increase in temperature will reduce the viscosity of the liquid, which can then flow out of the cells and distribute thermal energy to the inner portion of the material thus providing for better thermal management of the overall structure.

The energy-attenuation structure of the present application is able to meet today's demand for materials having combinations, often unusual combinations of properties that cannot be achieved with conventional materials. For example, aerospace engineers are increasingly in search of an adaptive structure that suits the entire flight mission. Currently, it is often necessary to use blankets in order to suppress the acoustic load that arises during lift off of a launch vehicle. With the energy-attenuation structure of the present application it will now be possible to provide a fairing structure having adaptive mechanical and other characteristics as required. For example, a laminated sandwich panel having two stiff and/or flexible skins separated by the innovative core layer of open and "closed" cells filled with a suitable liquid can provide a great deal of thermal insulation, radiation shielding, vibration isolation, sensing capability, etc., depending upon need. Furthermore by way of example, separating the faces of the skins by the core layer increases the moment of inertia with little increase in weight, thus producing an efficient structure.

Although reference has been made to the acoustics, etc. encountered with launch vehicles, it will be appreciated that the energy-attenuation structure of the present application can be used in any other setting where it is desired to absorb energy, for example to isolate noise and/or vibrations.

Further specific features of the present invention will be described in detail subsequently.

BRIEF DESCRIPTION OF THE DRAWINGS

The energy-attenuation structure of the present application will now be described in conjunction with the accompanying schematic drawings, in which.

DESCRIPTION OF SPECIFIC EMBODIMENTS

Figure 1:
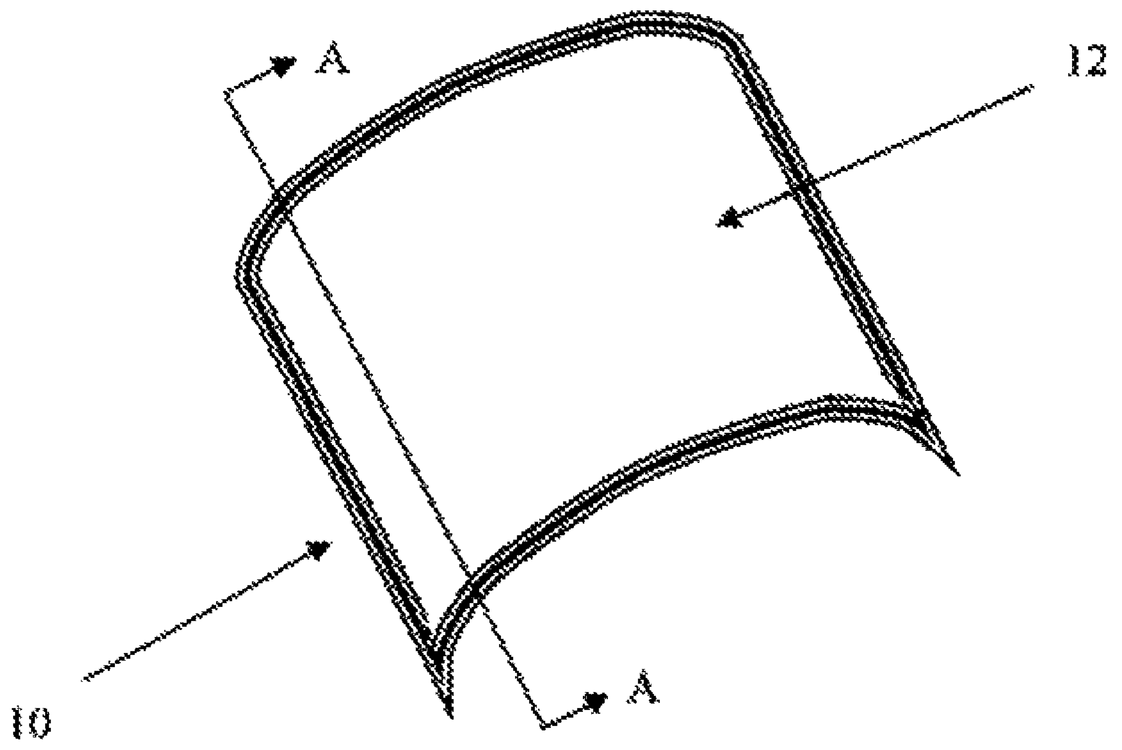
FIG. 1 illustrates a core layer of the energy-attenuation structure of the present application.

Referring now to the drawings in detail, the energy-attenuating structure of the present application, which is designated generally by the reference numeral 10, comprises a core layer 12 comprised of a cellular material, in other words a material that is composed of cells, such as a foam material. Substantially all of the cells of the cellular material are open cells, wherein those cells 14 that are disposed in a central portion of the core layer 12 are more open than are those cells 13 that are disposed in outer portions of the core layer. Furthermore, the openness of the cells 13 and/or 14 generally decreases from the interior of the core layer 12 in a direction toward the outer portions thereof. At least some of the cells, and in certain applications substantially all of the cells, of the core layer are filed with a liquid.

Figure 2:
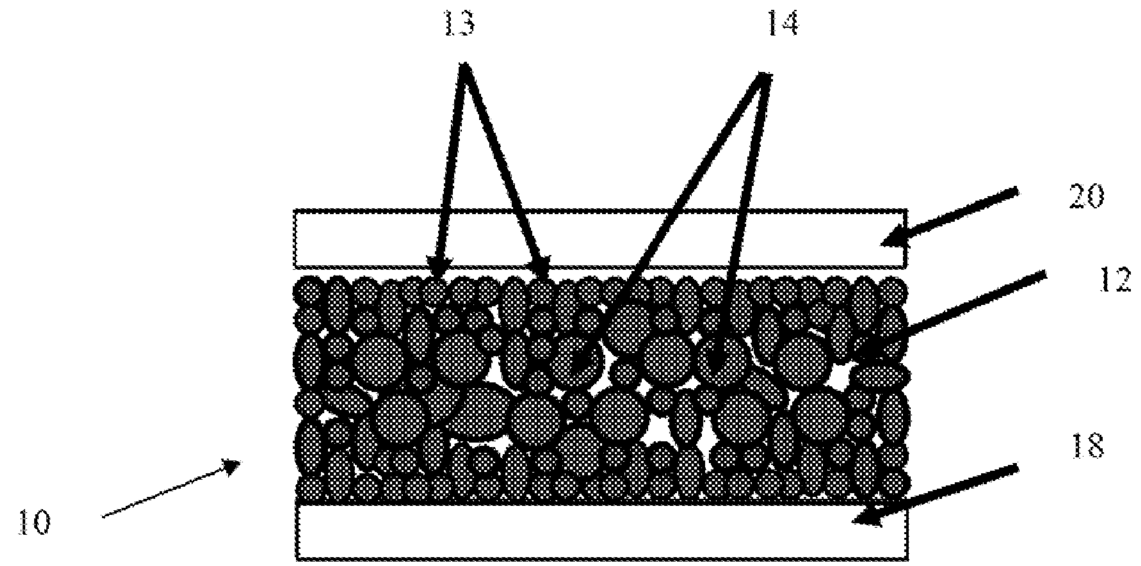
FIG. 2 illustrates the grated or graded structure of the core layer.

The cellular material of the energy-attenuating structure of the present application has a graded porous structure, as indicated schematically in FIG. 2. In other words, the cell size, openness of the cells, cell wall thickness, and/or functionality of the cells is not homogeneous from the interior of the core layer 12 to the outer portions thereof. Nor is the progression of these parameters necessarily uniform from the interior to the outer portions. With regard to functional grading, when at least some of the cells of the core layer 12 are filled with a liquid, essentially two different types of cells are provided or created. Those cells 13 disposed in the outermost portions of the core layer 12, and which contain liquid, perform more like closed cells. In other words, when subjected to pressure the content of the cells will not change, as will be discussed in detail subsequently. In contrast, those cells 14 disposed near the center of the core layer 12 will behave more like open cells. In other words, when subjected to load or pressure, the content of these cells can be squeezed or pressed out. Thus, with the energy-attenuating structure 10 of the present application, a layering effect is actually achieved with a single layer, namely the core layer 12.

Reference has been made to the openness of the cells 13, 14 of the cellular material. Since an open-cell cellular material is used for the core layer 12 of the energy-attenuating structure 10 of the present application, these open cells are provided with pores 15 and 16 as shown by way of example in FIGS. 3*a* and 3*b*. As indicated above, the openness or pore size of the cells generally decreases from the interior of the core layer 12 in a direction toward the outer portions thereof. Furthermore, at least the larger cells, and preferably most if not all of the cells, can be provided with a plurality of such pores or openings.

As will be discussed in greater detail subsequently, liquid is caused to enter even those cells 13 having very small pores 15 by raising the temperature of the liquid during the filling process so that the viscosity of the liquid is reduced sufficiently to allow the liquid to enter even small pores. However, when the liquid is again cooled after the cooling process, such as to room temperature, the liquid can no longer exit through the small pores 15 of the cells 13 when the cellular material, or a portion thereof, is compressed. Thus, under these circumstances those cells 13 having very small pores 15 actually act like closed cells. In contrast, the cells 14 that are provided with larger pores or openings 16 do not retain the liquid filled therein when these cells are subjected to pressure, and thus continue to act like open cells.

As indicated above, the cellular material is preferably a foam material, such as a polyurethane foam, the method of manufacture of which is well known. For example, the polyurethane foam can be produced by adding water to one of the liquid precursors of polyurethane before they are mixed together. A reaction with a portion of the isocyanate results, generating carbon dioxide through the liquid and creating bubbles; the open cells that are produced then harden to form a solid, yet flexible, foam as polymerization progresses. Careful control of viscoelastic properties can be achieved by modifying the catalyst and other chemicals that are used during the production of the foam. Thus, the desired variation in cell size, the openness of the cells, and the cell wall thickness can be varied as desired. It should also be noted that a metallic foam could also be utilized. For example, a nickel coated metal foam, which is commercially available, could be utilized. Such a foam is manufactured by coating polyurethane foam with nickel vapor, and then removing the polyurethane foam, for example by heating the nickel-coated foam to greater than the melting point of the polyurethane, so that only the nickel structure remains. Due to the thinness of the nickel coating, this foam is also flexible.

Figure 3A:
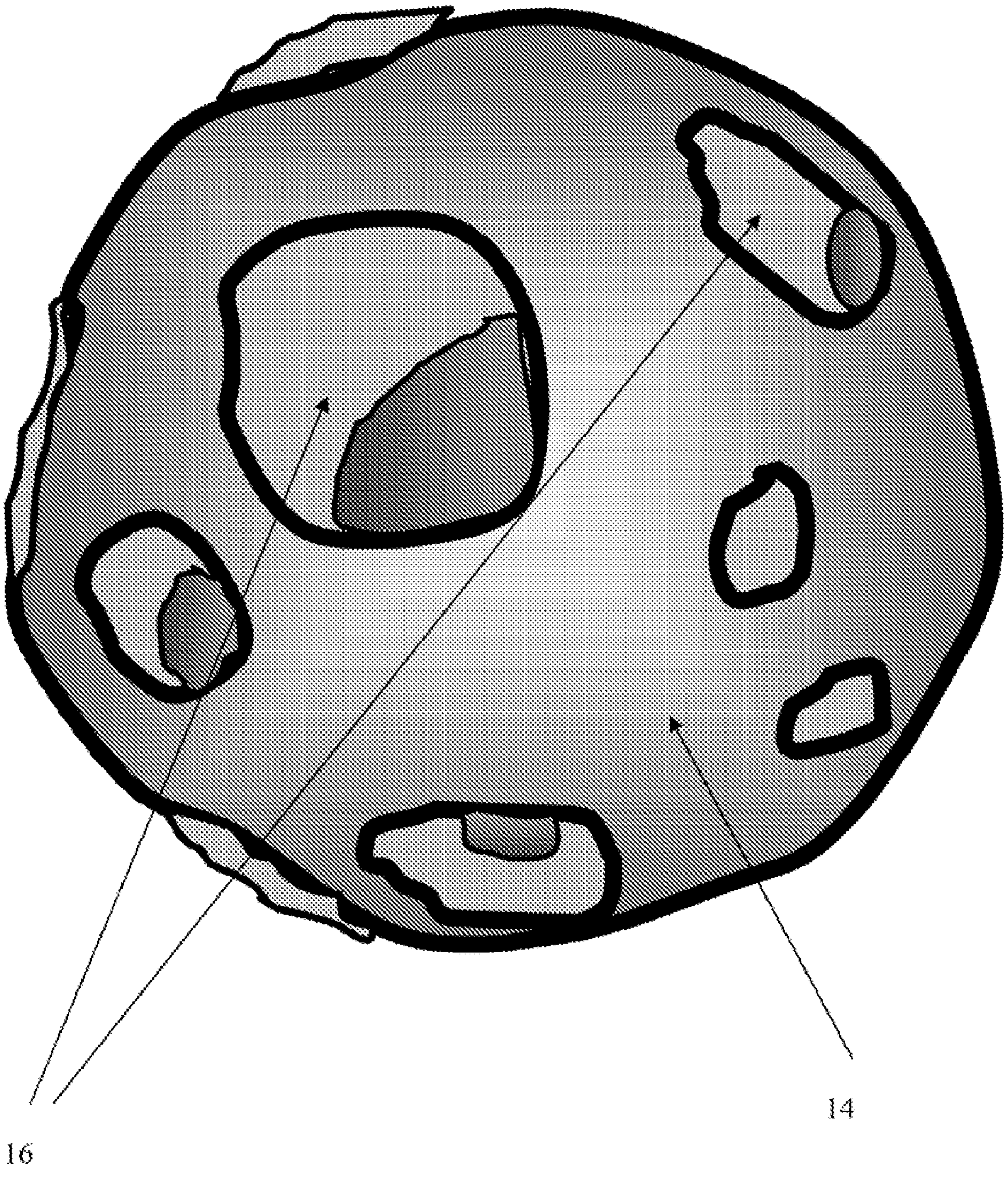
FIGS. 3*a* & 3*b* show the cells of inner and outer portions respectively of the core layer.
Figure 3B:
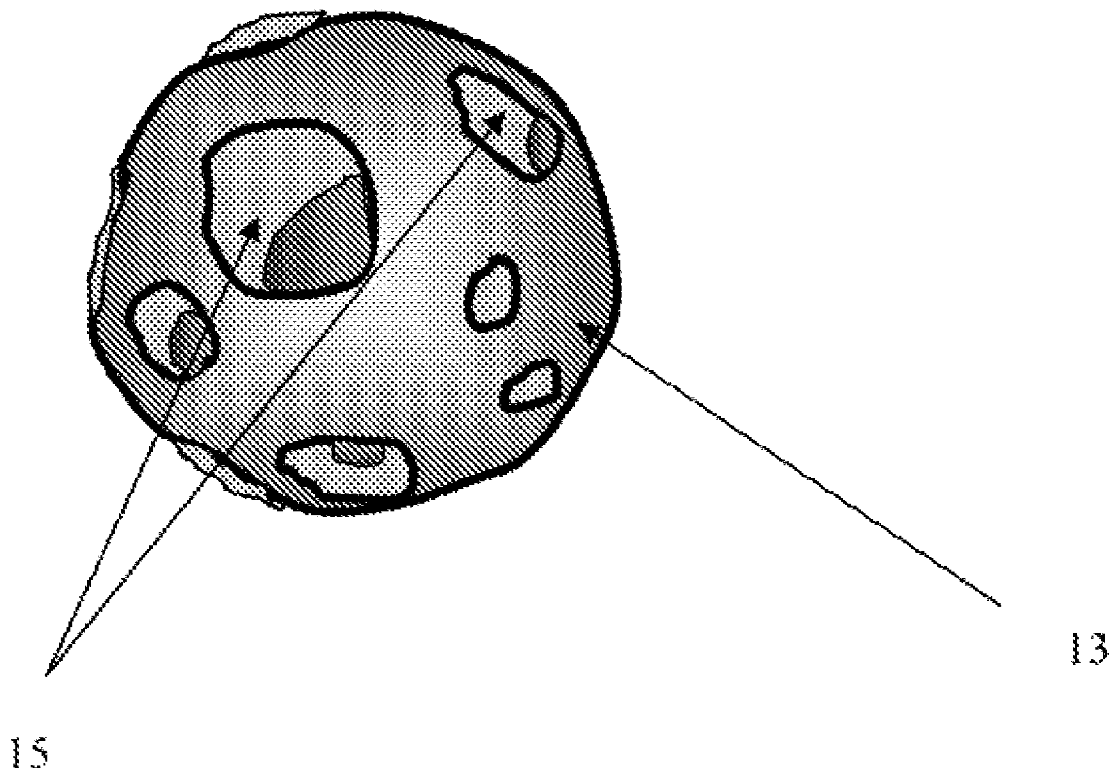

FIGS. 3*a* and 3*b*, which are drawn to the same scale, illustrate that the cells 14 disposed near the center of the core layer 12 are several times larger than are the cells 13 disposed in the outermost regions of the core layer 12.

Figure 4:
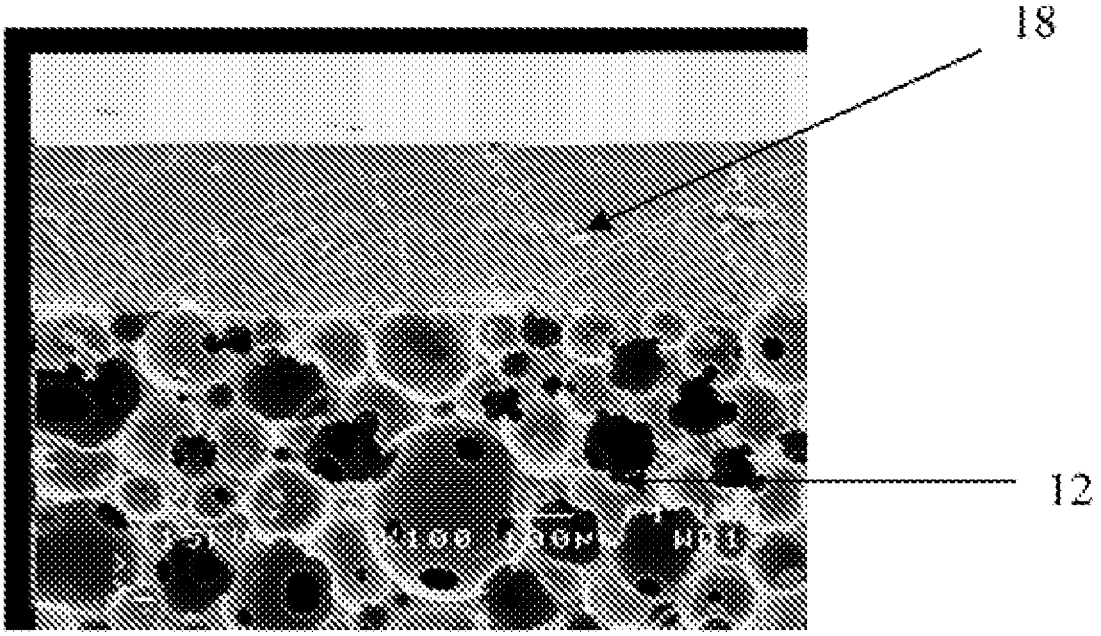
FIG. 4 is a microscopic image showing the graded nature of the core layer.

FIGS. 2 and 4 show an exemplary distribution of cells 13 and 14 within a core layer 12. In particular, FIG. 2 schematically illustrates how the interior or central portion of the core layer 12 contains more large cells 14 than do the outer portions of the core layer 12. The larger, interior cells 14 also generally contain a greater number of pores 16, and/or pores 16 that are more open, than is the case with the cells 13 that are located in the outer portions of the core layer 12.

A further possibility exists where the starting material is a foam having uniform cells. In such a case, a spatially graded structure can be obtained by pressing the starting material, under thermo-mechanical means, including high temperature, to fuse under thermo-mechanical means, including high temperature, to fuse a number of the cells that are close to the outer surfaces in order to make them smaller and/or to close some of them. The reproduced microscopic image of FIG. 4 shows half of a core layer 12, and also illustrates the distribution and the pores of the cells 13 and 14.

At least some, and possibly also a substantial number, of the cells 13 and 14 of the core layer 12 are filled with a liquid, by way of example, water. Any suitable method can be used to fill the open cells of the foam with the liquid, or with a mixture of liquids, depending in part upon the desired percentage of cells 13 or 14 that are to be filled and also the end application. The more cells that are filled with liquid, the fewer cells that will remain filled with air, carbon dioxide, or some other gas. The viscosity and boiling point of the liquid utilized are the primary parameters of interest with regard to the end application of the core layer 12.

Two exemplary methods for tilling cells 13 and 14 of a core layer 12 with liquid will now be discussed in conjunction with an open cell polyurethane foam. Such a foam can withstand temperatures of between −40° C. to 90° C. on a continuous basis, and temperatures of up to 125° C. on an intermittent basis. Water can be used as the liquid. In this connection, it should be noted that at 20° C. water has a viscosity of 1.002 centipoise (cp), whereas at 80° C. the viscosity of water is 0.355 cp, in other words, nearly one third of the viscosity at room temperature. By way of example only, the open cell polyurethane foam can have a cell diameter ranging from 25 to 225μ, and pore or hole sizes in the cells varying from 7 to 75μ. The thickness of the core layer 12 is a function of the application thereof.

The air or gas within the cells 13 or 14 can be replaced by the liquid by roller means or in a vacuum situation. For example, a roller means, such as in the form of a roller pin or mechanical roller, can force gas out of the foam, which has been submerged in liquid in a shallow tank. The liquid will gradually fill the space formerly filled by the gas, which can be seen to escape in the form of bubbles. Maximum filling is achieved when bubbles are no longer observed escaping through the liquid. An alternative method would be to enclose the foam in a vacuum bag or other enclosure and then to apply vacuum thereto. The amount of vacuum applied will determine the volume of cells that will be filled with liquid.

As discussed above, some of the cells, primarily those disposed in the outermost portions of the core layer 12, perform more like closed cells in the final product. This is due to the fact that the pores 15 of the cells 13 are much smaller than the pores 16 of the larger cells 14, especially those disposed in the central portion of the core layer 12. By controlling the temperature of the liquid during the filling process, the viscosity of the liquid can be reduced to a sufficient extent to allow the desired amount of liquid to enter the cells 13 and/or 14 via even the smaller pores 15 thereof. Once filling has been achieved, and the temperature has been reduced, the viscosity of the liquid again increases, so that even when the core layer 12 is subjected to pressure, the liquid will remain in the cells 13 having the smaller pores 15. In contrast, the liquid can escape through larger pores 16 of in particular larger cells 14 disposed in the central portion of the core layer 12. It should also be noted that some liquid will be contained in the core layer 12 between the cells 13 and 14.

Figure 5:
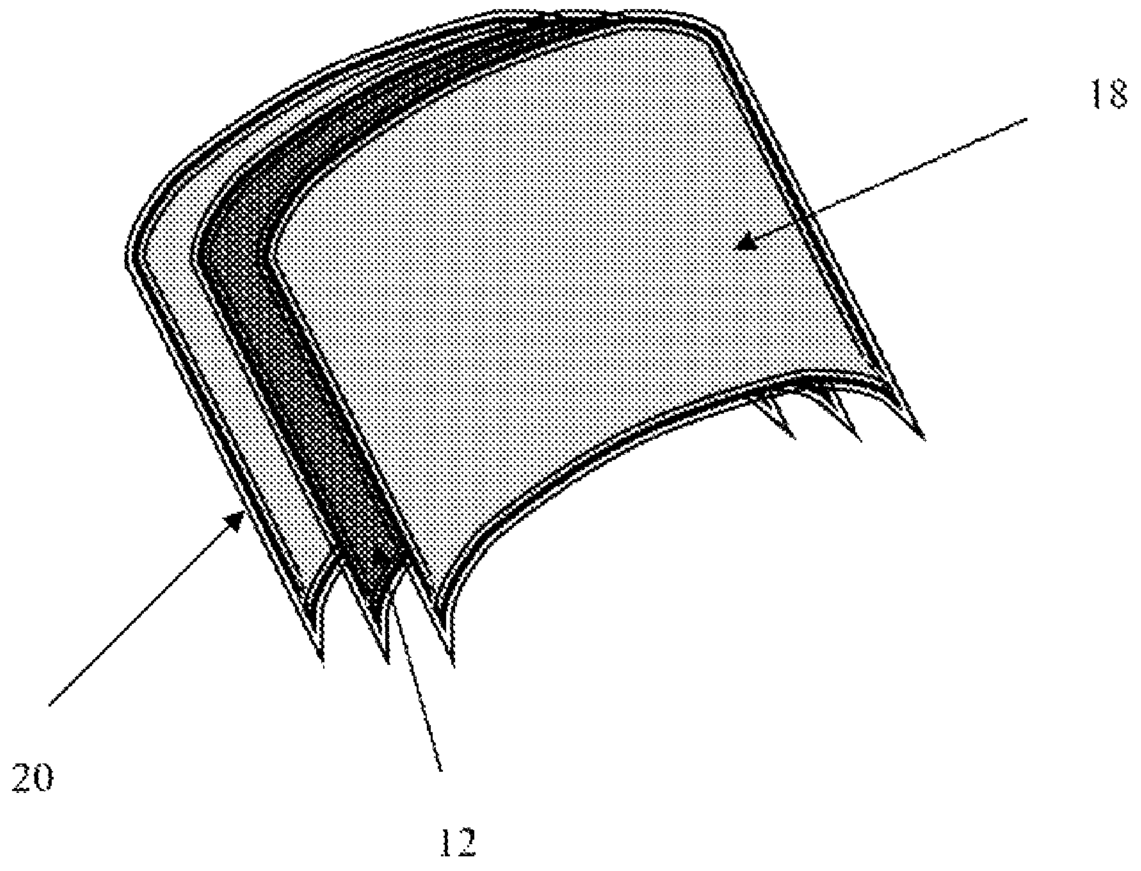
FIG. 5 illustrates additional layers on both sides of the core layer.

FIG. 1 illustrates the liquid-filled core layer 12 by itself. However, in order to adapt the core layer 12 to different applications, it would optionally also be possible to provide one or more additional layers on either or both sides of the core layer 12. Such a situation is illustrated in FIGS. 2, 4 and 5. One or more layers or skins 18, 20 can be formed on, applied to, or bonded to the core layer 12. FIGS. 2 and 5 show both an inner layer 18 and an outer layer 20 on opposite sides of the core layer 12. By way of example only, the skin layers 18, 20 can be composed of epoxy resins, and can also be fiber reinforced. Alternatively, or in addition thereto, a layer of closed cells can be disposed adjacent to the core layer 12 and/or on an outer side of one of the skins 18 or 20. The skins 18, 20 can be used to provide additional properties to the overall energy-attenuation structure 10, including stiffness, reflectivity or absorption, for example of acoustics, thermal management, explosive impact, etc. At least one of the skins can have a smooth and/or reflective outer surface.

The present invention is, of course, in no way restricted to the specific disclosure of the specification and drawings, but also encompasses any modifications within the scope of the appended claims.

I claim:

1. An energy-attenuation structure, comprising:

a core layer (12) comprised of a material composed of cells (13 and 14), substantially all of which are open cells, wherein those cells (14) disposed in a central portion of said core layer (12) are more open than are those cells (13) disposed in outer portions of said core layer, further wherein the openness of the cells generally decreases from an interior of said core layer (12) in a direction toward said outer portions such that impermeable faces are formed at said outer portions, and wherein at least some of the cells (13 and 14) of said core layer (12) are filled with liquid to provide an energy-attenuation structure.

2. An energy-attenuation structure according to claim 1, wherein said core layer (12) is comprised of resilient and flexible cellular material.

3. An energy-attenuation structure according to claim 2, wherein said cellular material is an open-celled foam material.

4. An energy-attenuation structure according to claim 3, wherein said foam material is selected from the group consisting of polyurethane, nickel and other foam/porous materials.

5. An energy-attenuation structure according to claim 1, wherein said structure is a composite structure having at least one skin layer (18, 20) disposed on at least one side of said core layer (12).

6. An energy-attenuation structure according to claim 5, wherein said at least one skin layer (18, 20) is at least one of the group consisting of an epoxy resin layer and a closed-cell layer.

7. An energy-attenuation structure according to claim 6, wherein said epoxy resin layer is an unreinforced or a fiber reinforced layer.

8. An energy attenuation structure according to claim 5, wherein said at least one outer skin layer has a smooth and reflective outer surface.

9. An energy-attenuation structure according to claim 1, wherein said core layer (12) is adapted to be disposed on a rigid structure.

10. An energy-attenuation structure according to claim 1, wherein substantially all of the cells (13 and 14) of said core layer (12) are filled with liquid.

11. An energy-attenuation structure according to claim 1, wherein said liquid is water.

12. An energy-attenuation structure according to claim 1, wherein also a size of the cells (13, 14) of said core layer (12) generally decreases from an interior of said core layer in a direction towards said outer portions.

13. A method of producing an energy-attenuation structure, including the steps of:

providing an open-celled foam core layer (12), substantially all of the cells of which are open cells, wherein those cells disposed in a central portion of said core layer (14) are more open than are those cells (13) disposed in outer portions of said core layer, further wherein the openness of the cells (14) generally decreases from an interior of said core layer (12) in a direction toward said outer portions to form impermeable faces at said outer portions;

removing at least some of the gas from at least some of the cells (13 and 14) of the core layer (12); and allowing liquid to at least partially fill at least some of the cells (13 and 14) of said core layer (12) to provide an energy-attenuation structure.

14. A method according to claim 13, wherein said step of allowing liquid to fill at least some of the cells (13 and 14) includes the step of increasing the temperature of the liquid to reduce the viscosity thereof, and upon reaching a desired fill state to cool the liquid to room temperature.

15. A method according to claim 13, wherein said step of removing gas from cells (13 and 14) of said core layer (12) includes the step of mechanically rolling gas out of said foam core layer (12).

16. A method according to claim 13, wherein said step of removing gas from cells (13 and 14) of said core layer (12) includes the step of applying a vacuum to said foam core layer (12).

17. A method according to claim 13, which includes the step of disposing at least one skin layer (18, 20) on said core layer (12) to form a laminate structure.

18. A method according to claim 13, wherein said providing step comprises thermo-mechanically pressing a foam material having uniform cells to form a spatially graded structure.

19. An energy-attenuation structure according to claim 12, wherein the impermeability of said faces at said outer portions is provided by said decreased-size cells at said outer portions.

20. An energy-attenuation structure according to claim 1, wherein the impermeability of said faces at said outer portions is present at 20° C.

* * * * *